United States Patent [19]
Courtin

[11] Patent Number: 5,718,025
[45] Date of Patent: Feb. 17, 1998

[54] FIXING DEVICE

[75] Inventor: Christian Courtin, Eragny, France

[73] Assignee: ITW de France, Beauchamp, France

[21] Appl. No.: 720,503

[22] Filed: Sep. 30, 1996

[30] Foreign Application Priority Data

Nov. 13, 1995 [FR] France .................. 95 13387

[51] Int. Cl.⁶ .................. A44B 17/00; F16B 19/00
[52] U.S. Cl. .................. 24/453; 411/508; 411/510
[58] Field of Search .................. 24/453, 297, 573.1; 411/508, 510

[56] References Cited

U.S. PATENT DOCUMENTS

| 3,177,540 | 4/1965 | Hall et al. .................. 24/453 |
| 3,810,279 | 5/1974 | Swick et al. . |
| 4,396,329 | 8/1983 | Wollar .................. 411/510 |
| 4,728,238 | 3/1988 | Chisholm et al. .................. 411/510 |
| 4,902,182 | 2/1990 | Lewis .................. 411/510 |
| 4,938,645 | 7/1990 | Wollar .................. 411/510 |
| 5,306,098 | 4/1994 | Lewis . |
| 5,393,185 | 2/1995 | Duffy, Jr. .................. 411/510 |
| 5,468,108 | 11/1995 | Sullivan et al. .................. 411/510 |

FOREIGN PATENT DOCUMENTS

| 390653 | 11/1989 | Austria . |
| 2589204 | 10/1985 | France . |
| 2077845 | 12/1981 | United Kingdom . |

*Primary Examiner*—Victor N. Sakran
*Attorney, Agent, or Firm*—Schwartz & Weinrieb

[57] ABSTRACT

A fixing device having a stem (3) adapted to be retained in a wall, this stem having a shaft (9) carrying flexible non-return blades (13A, 13B, 13C, 13D), and having at least three longitudinal wings (10A, 10B, 10C, 10D) oriented in respective planes which intersect at the central longitudinal axis of the shaft, with the surface defining the free end of two of such wings being adjacent to the contour provided for the hole when the latter and the shaft are disposed concentrically.

24 Claims, 2 Drawing Sheets

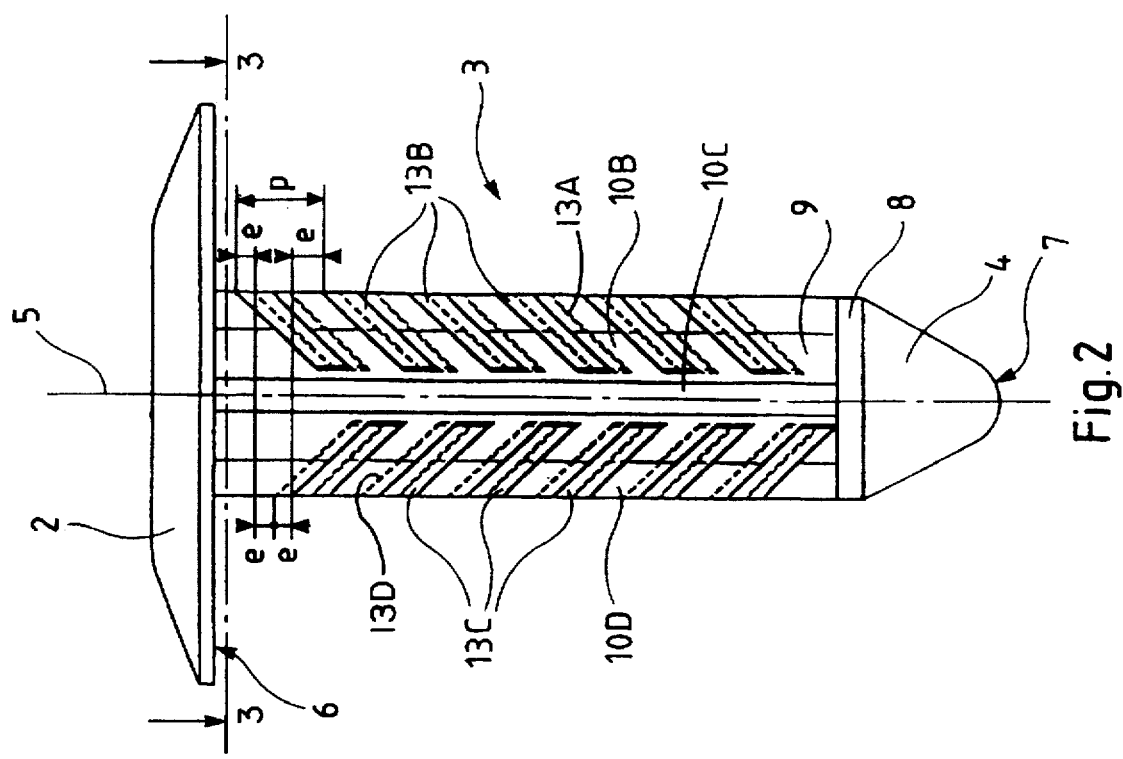
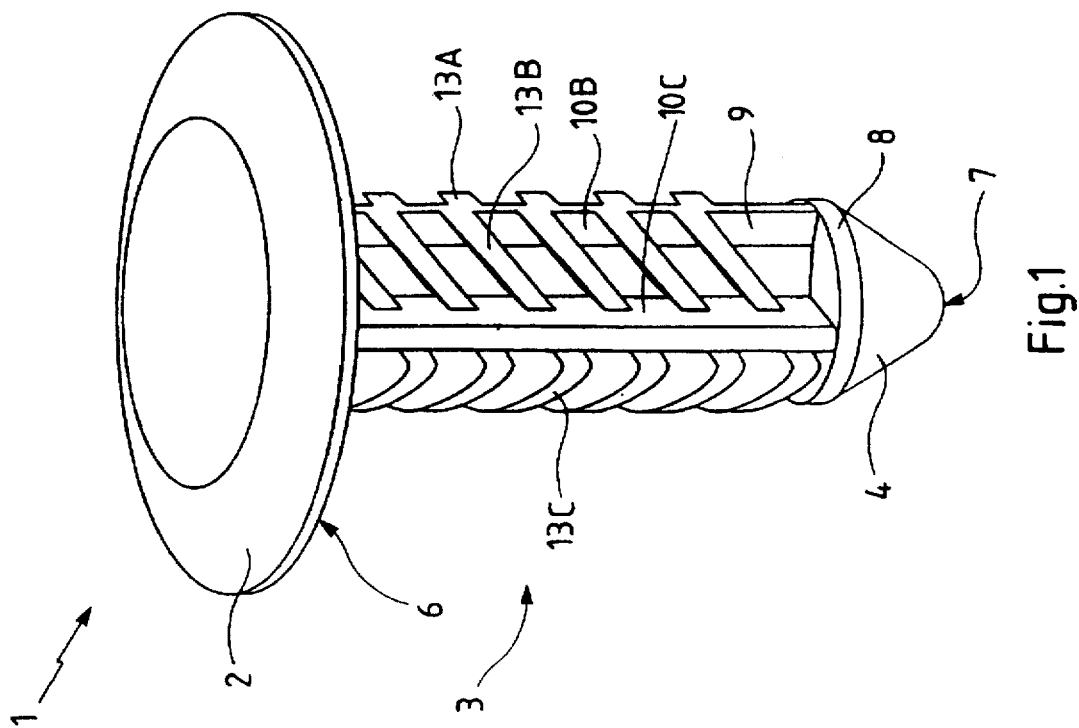
Fig.1
Fig.2

5,718,025

FIXING DEVICE

FIELD OF THE INVENTION

The present invention relates to a fixing device having a stem adapted to be retained in a wall after it has been inserted into a hole with a predetermined contour in such wall.

BACKGROUND OF THE INVENTION

Such fixing devices are already known, generally called marine anchors or Christmas trees, whose stem has a shaft carrying flexible non-return blades each oriented in a plane disposed inclined with respect to the central longitudinal axis of the shaft, with the connection between the shaft and each elastic blade being oriented transversely to the slope of the blade, and each blade including an end portion which, at rest, extends beyond the predetermined contour of the hole when the latter and the shaft are disposed concentrically, so that, during the insertion of the fixing device into the hole, the flexible blades make contact with the edge of the hole, flexing so as to be located fully within the contour of the hole, which they can then penetrate, whereas when the fixing device, having been inserted into the hole, is attempted to be driven in the direction of extraction, the flexible blades tend to flex in the direction which causes them to extend further beyond the contour of the hole, thereby enabling the fixing device to resist extraction.

OBJECT OF THE INVENTION

The invention aims, in general terms, to improve the performance of this type of fixing device, both in terms of its insertion into the hole and in terms of the holding power which it affords once it has been put in place.

SUMMARY OF THE INVENTION

The present invention proposes to this end a fixing device having a stem adapted to be retained in a wall after it has been inserted into a hole with a predetermined contour in such wall, the stem having a shaft carrying flexible non-return blades each oriented in a plane disposed inclined with respect to the central axis of the shaft, each flexible blade having, at rest, an end portion extending beyond the predetermined contour of the hole when the blade and the shaft are disposed concentrically; characterised in that the shaft has at least three longitudinal wings oriented in respective planes which intersect at the central longitudinal axis with the surface defining the free end of each wing being adjacent to the predetermined contour of the hole when the blade and the shaft are disposed concentrically.

The ends of the longitudinal wings, which are rigid and can be angularly distributed with respect to each other in a relatively spaced out and regular fashion, thereby guide the shaft with respect to the hole, enabling concentricity between them to be maintained while the stem is being inserted, so that such insertion is much easier and more convenient than with previous fixing devices.

Furthermore, during use, cooperation between the ends of the different longitudinal wings and the edge of the hole limits the radial clearance of the stem vis-a-vis the hole, thereby improving resistance to extraction, given that holding the shaft concentrically in the hole enables the non-return blades to work under optimum conditions.

Furthermore, this limited clearance makes it possible, where the wall is subject to mechanical excitations as occurs in a motor vehicle, to reduce the risk that the fixing device will start vibrating and produce noise nuisances.

According to preferred characteristics, at least one of the longitudinal wing carries, on at least one side, a series of the flexible blades, disposed parallel to each other and in a stepped fashion.

This fashion of placing the series of flexible blades on the shaft, which series enables the fixing device to be used for variable thicknessess, is in fact particularly simple and easy to use, in particular in cases where the fixing device is obtained by molding a plastic material.

According to other preferred characteristics of this embodiment, the stem has at least two series of flexible blades, each one of the series being positioned, along the central longitudinal axis, with an offset with respect to each of the other series.

By virtue of this offset, the situation is avoided whereby, during insertion, the blades of different series are simultaneously in the same state of flexion, thereby preventing the force to be exerted to insert the stem into the hole from being very high some of the time (as when a blade of each series is in a state of maximum flexion), and particularly weak at other times (as when a blade from each series is at the start of flexion), and on the contrary results in a relatively regular insertion force, whose maximum value remains moderate.

Furthermore, where the stem passes through the wall, and where resistance to extraction is thus produced by the flexible blades abutting against the face of the wall opposite the one through which the stem has been inserted into the hole, the offset between the series of wings reduces the axial distance which the stem can travel before the first non-return blade comes into contact with the wall.

The fact that the stem is thus able to move only over a relatively limited axial distance before meeting a first resistance to its movement (the maximum resistance is obtained following a larger movement, enabling several blades belonging to different series to come into abutment against the wall) notably offers the advantage of limiting the aforementioned risk that the fixing device will vibrate and produce noise nuisances.

It will be observed that, without the offset between the series of flexible blades, it would have been necessary, to obtain similar results, to have a distance between two successive blades in a series, of the same size as such offset, which would have necessitated a multiplication of the number of blades, and therefore increased raw materials, and would also entail, in cases where the fixing device is obtained by molding a thermoplastic material, serious difficulties in obtaining the mold, since the latter would need to have a particularly thin wall between two hollow portions so as to obtain successive blades in a series.

Preferably, for reasons of regularity and ease of production, the offset, along the central longitudinal axis, between one series of flexible blades and each one of the other series of blades, is equal to $xp/n$, where p is the constant distance apart at which the flexible blades of each pair of two successive blades in each series are positioned along the central longitudinal axis, n is the number of the series, and x an integer, between 1 and n−1, which is specific to each one of the other series.

Thus, if there are for example four series of flexible blades with a distance between two blades of 2.4 mm, the offset between a first series of blades and a second series of blades will be 0.6 mm, the distance between the first series of blades and a third series or blades will be 1.2 mm, and the distance between the first series of blades and a fourth series of blades will be 1.8 mm.

According to other preferred characteristics, the fixing device has exactly four longitudinal wings.

The shaft thus has a cross-shaped transverse section, a shape which affords an excellent ratio between the quantity of raw material needed and the quality of guidance provided vis-a-vis the hole.

According to other preferred characteristics, the fixing device has exactly four longitudinal wings, with two wings each carrying, on two opposite sides, a series of flexible blades, the two other wings not carrying any flexible blades.

This shaping of the shaft and this arrangement of flexible blades affords excellent results, in an eminently simple, convenient and economical fashion.

According to other preferred characteristics, each flexible blade is carried by a longitudinal wing, with a connection which is oriented according to the slope of the blade.

Thus, unlike the aforementioned prior fixing devices, each flexible blade, during the insertion of the stem, gradually comes into contact with the edge of the hole, by virtue of which the force to be exerted on the fixing device to insert the stem into the hole remains moderate.

According to other preferred characteristics, each flexible blade is inclined so that, during its insertion into the hole, the area of contact with the edge of the hole progressively approaches the wing which carries such blade.

Thus the area of the flexible blade which is first force to resist the extraction of the stem is located near the wing which carries such blade, so that this area is relatively inflexible, and therefore provides high-quality holding.

According to other characteristics, preferred as being favorable to the regularity of the force to be exerted to insert the stem into the hole, the end portion of each flexible blade which, at rest, extends beyond the predetermined contour of the hole, is crescent-shaped.

According to other preferred characteristics, notably for reasons of ease of use, the stem is connected, at one end, to a head, and has, at the other end, a conical tip centered on the longitudinal central axis.

BRIEF DESCRIPTION OF THE DRAWINGS

The disclosure of the invention will now continue with the disclosure of an exemplary embodiment, given hereinafter by way of non-limitative description in relation to the accompanying drawings, in which like reference characters designate like or corresponding parts throughout the several views and wherein:

FIGS. 1 and 2 are respectively a perspective view and an elevation view of a fixing device in accordance with the invention;

DETAILED DESCRIPTION OF THE PREFERRED EMBODIMENT

Figure 3:
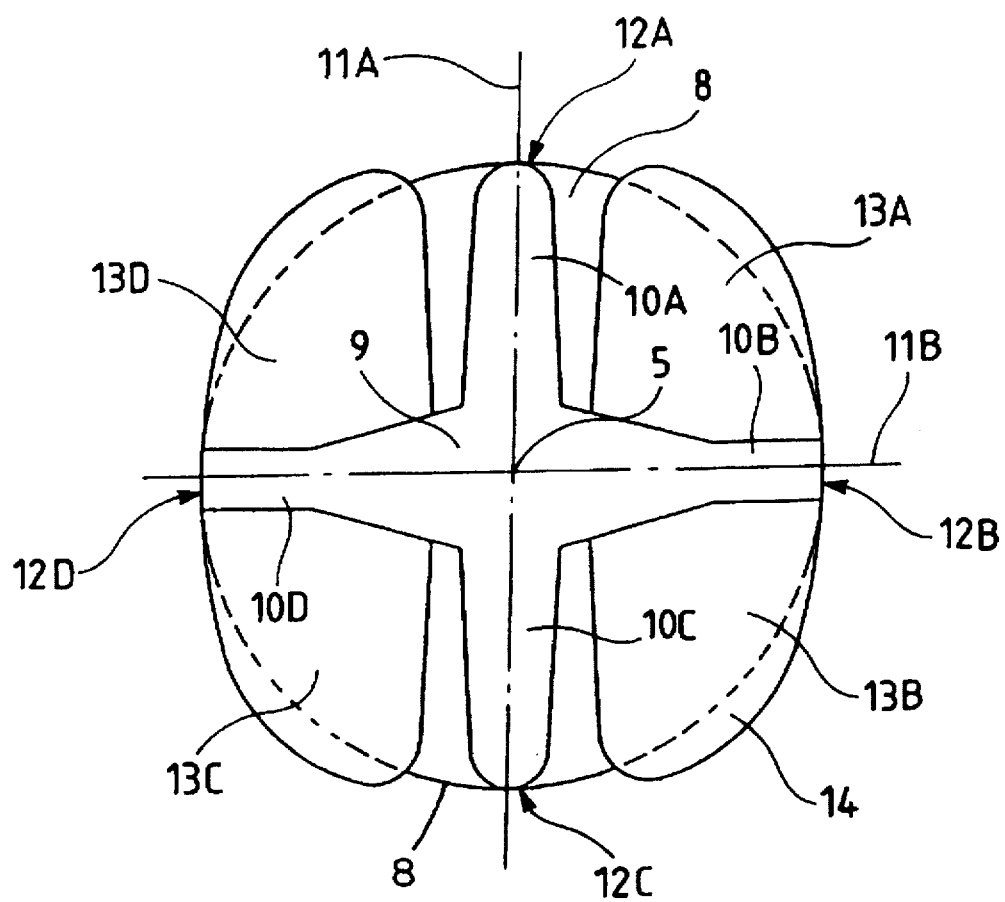
FIG. 3 is a view in cross section taken along the plane shown at 3—3 in FIG. 2.

The fixing device 1 illustrated in the drawings is obtained by molding a thermoplastic material.

It has a head 2 and a stem 3 provided, at the end opposite that by which it is connected to the head 2, with a conical tip 4, the stem 3 and the head 2 having a common longitudinal central axis 5.

The head 2 has a well-known shape, with a concave lower face 6 which extends radially with respect to the stem 3.

The tip 4, whose end 7 is rounded, enables the stem 3 to be easily centered in a well known manner with respect to the hole into which it is to be inserted, the base 8 of the tip 4 having the same contour as the hole into which it is envisaged that the stem 3 will be inserted.

The stem 3 has, between the base 8 of the tip 4 and the head 2, a shaft 9 having four longitudinal wings or ribs 10A to 10D, the wings or ribs 10A and 10C being oriented in a plane 11A while the wings 10B and 10D are oriented in a plane 11B, the planes 11A and 11B being perpendicular, and intersecting at the axis 5 as best seen in FIG. 3.

The respective surfaces 12A to 12D which delimit the free end of each of the wings exactly overhang or coincide with the contour of the base 8, as can be seen more particularly in FIG. 3, that is to say the surfaces 12A to 12D are adjacent to the predetermined contour for the hole in which the stem 3 needs to be inserted, when this contour and the shaft 9 are disposed concentrically, the contour provided here for the hole being circular.

The wings 10B and 10D each carry, on two opposite sides, a series of flexible non-return blades, respectively 13A to 13D.

The series of flexible non-return blades 13B will now be described more particularly, it being understood that the series of blades 13A, the series of blades 13C and the series of blades 13D are substantially the same as the series of blades 13B.

The blades 13B, which number six in this case, are disposed in parallel and in a stepped fashion, with a constant separation p (FIG. 2) along the axis 5, which is for example 2.4 mm.

Each of the blades 13B is substantially planar and oriented in a plane disposed inclined with respect to the axis 5, the inclination being such that the plane in which the blade 13B is oriented approaches the tip 4 at the same time as it approaches the axis 5.

As can be seen in FIG. 3, each blade 13B has at rest, that is to say in the position shown in FIGS. 1 to 3, which it takes spontaneously, an end portion 14, in this case crescent-shaped, which extends beyond the contour of the base 8, that is to say beyond the predetermined contour of the hole in which it is envisaged that the stem 3 will be inserted, when the shaft is disposed concentrically with respect to it.

It will be observed that each blade 13B, by virtue of the fact that it is connected to the wing 10B which carries it at its slope, will make contact only gradually with the edge of the hole in which the stem 3 is to be inserted, and that, given its inclination, the area of contact with the edge of the hole will first be situated in the vicinity of the wing 10C, and will then gradually approach the wing 10B which carries the blade 13B.

As can be seen in FIGS. 1 and 2, each series of flexible blades is positioned, along the axis 5, with an offset with respect to each of the other series.

More precisely, the series of blades 13B has with respect to the series of blades 13A an offset e (FIG. 2) towards the tip 4, the series of blades 13D having the same offset e, in the same direction, with respect to the series of blades 13A, and similarly for the series of blades 13C with respect to the series 13D.

In the example illustrated, the offset e is equal to one quarter of the distance p between two successive blades in any of the series of blades, so that there is also an offset e between the first blade 13C as spaced from the head 2 and the second blade 13B as spaced from the head 2, and more generally between the n-th blade 13C as spaced from the head 2 and the n-th+1 blade 13B as spaced from this head.

It will be observed that the end surfaces 12A and 12C of the wings 10A and 10C, which do not carry any flexible blade, are rounded with a much smaller radius than that of the base 8, while the surfaces 12B and 12D are rounded according to the radius of bore 8, so that the wings 10A and 10C make contact with the edge of the hole over a relatively linear area, while the wings 10B and 10D make contact with the edge of the hole over a wider area.

The faces of the wings 10B and 10D which carry the flexible blades are in the shape of a highly open concave dihedron, with an angle substantially equal to 165°, which enables the projection of the flexible blades to be adjusted, and therefore enables their ability to flex to be adjusted.

The ends of the flexible blades facing the outside are shaped in such a way that the surfaces delimiting these ends are parallel to the axis 5.

With the aid of FIGS. 4 and 5 an example of 16 use of the device 1 will now be described which consists of holding the object 15 on a support 16, this support 16 and this object 15 each having a thin wall in which is formed a circular hole of the same diameter as the base 8 of the tip 4, the sum of the thicknesses of these walls being approximately equal to the distance separating the head 2 from the blade 13B which is the closest thereto.

The stem 3 is firstly inserted into the hole in the object 15, with respect to which it is presented with the tip 4 first, which enables the stem 3 to be centered with respect to the hole, which is effected when the base 8 is located therein, the base 8 being pushed in by then exerting a force, for example with the thumb, on the head 2.

The flexible blade closest to the tip 4, which is one of the blades 13C, then makes contact with the edge of the hole, and begins to flex in order to be able to pass through the hole, the following blades, which are respectively a blade 13D, a blade 13A and a blade 13B, begin to cooperate in a similar fashion with the edge of the hole, the different blades of the stem 3 each flexing in turn so as to be able to pass into the hole.

The insertion of the device 1 into the hole of the support 16 takes place in exactly the same fashion, once the device 1 has been inserted into the hole of object 15, or at the same time, with the respective holes superimposed.

When the device 1 has been inserted into the two holes (FIG. 4), the face 6 of the head 2 bears against the object 15 while the upper faces of the blades 13A to 13D which are closest to the head 2 have at least parts of their portions 14 opposite the object 16.

Figures 4, 5:
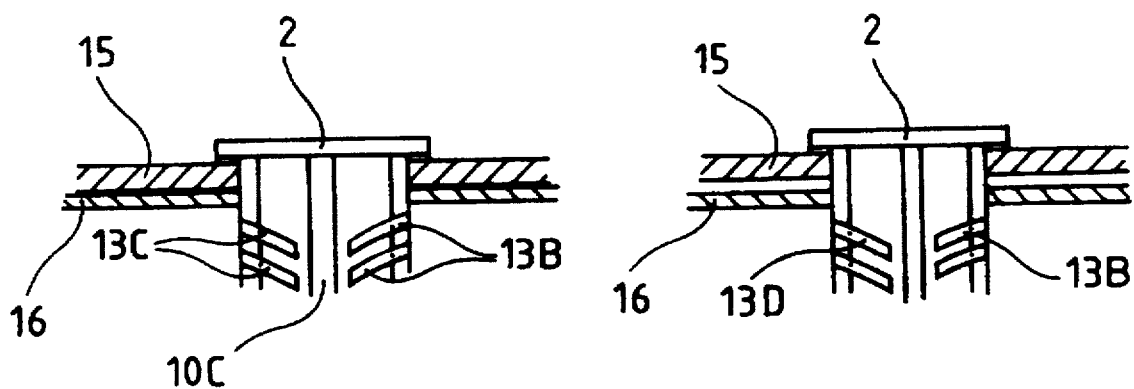
FIG. 4 is a partial, highly diagrammatic elevation view of the fixing device positioned in a respective hole of an object and of a support which it holds with respect to each other, such object and such support being shown in cross section.
FIG. 5 is a view similar to FIG. 4, but showing how the fixing device resists extraction when the object and the support tend to move away from each other.

It will be observed that the surfaces 12A and 12C have afforded, during the insertion of the device 1, guidance against the edges of the holes, which facilitated such insertion, and that in the position in FIG. 4 these surfaces limit the radial clearance of the device 1 with respect to the object 15 and support 16, and more generally afford excellent mutual holding between the device 1, the object 15 and the support 16.

The axial clearance of the assembly of the latter is determined by the difference between the sum of the thicknesses of the abutted walls of the object 15 and support 16, and the distance separating the flexible blade closest to the head 2, which is a blade 13B, from the head 2, the clearance being limited on the one hand by the head 2 coming into contact with the object 15, and on the other hand by the part of such blade 13B coming into contact with the support 16.

When a significant extraction force is exerted on the device 1, for example in the case whereby the object 15 tends to move away from the support 16 as shown in FIG. 5, the blade 13B, which makes contact first with the support 16, flexes sufficiently for a blade 13A to come in turn against the support 16 and, depending on the magnitude of the extraction force, there may even be a set of blades 13A to 13D bearing on the support 16 to resist extraction.

It will be noted that, by virtue of the arrangement just described, the device 1 can be inserted into the hole in one or more thin walls, with a relatively even force whose maximum intensity remains moderate, and in any case considerably weaker than the force needed to extract the device 1 from the hole into which it has been inserted.

It will be observed that, in the example of use illustrated in FIGS. 4 and 5, only the flexible blades closest to the head 2 are useful for preventing the device 1 from being extracted.

It is, however, advantageous to have provided a series of at least two flexible blades disposed in a stepped fashion, given the major variations in size which the object 15 and the support 16 may exhibit, given that the walls seen in FIGS. 4 and 5 each consist of a metal sheet with a hole formed by punching.

It will be observed that in accordance with another use of the device 1, the hole in the object 15 can be larger than the one in the support 16, so long as the hole in 15 has a diameter smaller than that of the head 2.

In accordance with yet another use, the stem 3 is inserted into a hole in a thick wall through which it does not pass.

Numerous variants are possible depending on the circumstances.

Thus, in variants not depicted, each series of blades 13A to 13D is formed only by two distinct blades; the shaft 9 is replaced by a shaft having only three arms, or by a shaft having more than four arms, the different arms being regularly distributed angularly, that is to say, in cases wherein there are three arms, each arm is spaced apart from neighboring arms by 120° and, in cases whereby there are five arms, by 72°; the number of series of flexible blades carried by the shaft is fewer than four, for example a single series, or greater than four; the flexible blades ere located on the shaft in a different manner, for example each wing carries a series of flexible blades on a single side, or the connection between each flexible blade and the wing which carries it is oriented transversely to the slope of the blade; the contour of the hole into which the fixing device is to be inserted is not circular in shape, for example it is oval; the head 2 is replaced by a different head, for example provided with a fixing means for an object to be fixed to the wall in which the stem of the fixing device must be inserted, or the stem 3 is integrated directly into the object to be fixed, or the head 2 is eliminated, and a recess is formed in the shaft so as to receive a screw for example.

It should be stated that the invention is not limited to the examples described and depicted. Many modifications and variations are possible. It is therefore to be understood that within the scope of the appended claims, the present invention may be practiced otherwise than as specifically described herein.

I claim:

1. A fixing device, comprising:
    a stem, having a longitudinal central axis, for insertion within a hole, having a predetermined contour, defined within a panel;

a head attached to a first end of said stem for engaging a first surface portion of said panel when said stem of said fixing device is inserted into said hole defined within said panel;

a substantially pointed tip, having a base portion which has a periphery of a predetermined contour which is adapted to substantially match said predetermined contour of said hole defined within said panel, attached to a second opposite end of said stem for initially guiding said fixing device into said hole defined within said panel;

at least three longitudinally extending ribs mounted upon said stem and projecting radially outwardly from said longitudinal central axis of said stem toward peripheral regions of said stem such that distal end portions of said ribs, remote from said longitudinal central axis of said stem, are substantially coincident with said periphery of said base portion of said tip so as to axially guide said fixing device as said fixing device is inserted through said hole defined within said panel; and at least three flexible blade means, mounted upon said at least three longitudinally extending ribs so as to be disposed within planes which are inclined with respect to said longitudinal central axis of said stem, and having end portions disposed at normal, undeflected positions at which said end portions extend beyond said periphery of said base portion of said tip for engaging an edge portion of said hole defined within said panel when said stem of said fixing device is inserted into said hole of said panel such that said end portions of said flexible blade means are deflected radially inwardly away from said normal positions so as to permit a portion of said stem to pass through said hole defined within said panel, whereupon said end portions of said flexible blade means having passed through said hole defined within said panel, said end portions of said flexible blade means will return to said normal positions so as to engage a second surface portion of said panel and thereby retain said fixing device inserted within said panel;

wherein said at least three flexible blade means mounted upon said at least three longitudinally extending ribs are longitudinally offset by a predetermined amount with respect to each other such that each one of said at least three flexible blade means mounted upon said at least three longitudinally extending ribs is longitudinally offset by a predetermined amount with respect to each adjacent one of said at least three flexible blade means so as to facilitate insertion of said fixing device into said hole defined within said panel and to enhance extraction resistance of said fixing device out from said hole defined within said panel.

2. A fixing device as set forth in claim 1, wherein:

said at least three longitudinally extending ribs comprises four ribs equiangularly spaced about said longitudinal central axis of said stem.

3. A fixing device as set forth in claim 2, wherein:

said at least three flexible blade means comprise four sets of flexible blade means.

4. A fixing device as set forth in claim 3, wherein:

said four sets of flexible blade means are mounted upon opposite sides of only two of said four longitudinally extending ribs such that two sets of said four sets of flexible blade means are mounted upon opposite sides of each one of said only two of said four longitudinally extending ribs.

5. A fixing device as set forth in claim 4, wherein:

each one of said two sets of said four sets of flexible blade means mounted upon a particular one of said only two of said four longitudinally extending ribs is longitudinally offset, by a first predetermined amount, with respect to the other one of said two sets of flexible blade means mounted upon said particular one of said only two of said four longitudinally extending ribs, and is also longitudinally offset with respect to said other two sets of said four sets of flexible blade means mounted upon the other one of said only two of said four longitudinally extending ribs, by a second predetermined amount which is different from said first predetermined amount, so as to facilitate insertion of said fixing device into said hole defined within said panel and to enhance extraction resistance of said fixing device out from said hole defined within said panel.

6. A fixing device as set forth in claim 5, wherein:

said first and second predetermined offset amount defined between said sets of flexible blade means comprises xp/n wherein p comprises the distance defined between successive flexible blade means within a particular set of flexible blade means, n comprises the number of sets of said flexible blade means, and x comprises a number between 1 and n−1 which designates the spacing, in terms of sets, between said particular set of flexible blade means and another one of said four sets of flexible blade means.

7. A fixing device as set forth in claim 3, wherein:

said flexible blade means disposed within each one of said four sets of flexible blade means are parallel to each other.

8. A fixing device as set forth in claim 3, wherein:

each one of said four sets of flexible blade means comprises six flexible blade members.

9. A fixing device as set forth in claim 2, wherein:

said four ribs are disposed within two planes which intersect each other at said longitudinal central axis of said stem.

10. A fixing device as set forth in claim 9, wherein:

said two planes are disposed mutually orthogonally with respect to each other.

11. A fixing device as set forth in claim 1, wherein:

said at least three longitudinally extending ribs extend longitudinally between said head of said fixing device and said base of said tip of said fixing device.

12. A fixing device as set forth in claim 1, wherein:

said tip of said fixing device has a substantially conical configuration with the apex portion of said tip being rounded.

13. A fixing device as set forth in claim 1, wherein:

said end portions of said flexible blade means have crescent-shaped configurations.

14. A fixing device as set forth in claim 1, wherein:

said at least three flexible blade means comprises at least three sets of longitudinally spaced flexible blade means with each set of said at least three sets of said flexible blade means being longitudinally offset by a predetermined amount with respect to the other sets of said at least three sets of said flexible blade means such that each one of said at least three sets of said flexible blade means is longitudinally offset by a predetermined amount with respect to each adjacent one of said other sets of said at least three sets of said flexible blade means whereby a particular one of said flexible blade means within a particular set of said at least three sets of said flexible blade means is progressively offset by a predetermined amount from other flexible blade means disposed within said other sets of said at least three sets of said flexible blade means as considered in a circumferential direction about said longitudinal central axis of said stem.

15. In combination, a fastening system, comprising:

at least one panel member having a hole, having a predetermined contour, defined therein; and a fastener for insertion into said hole defined within said at least one panel member;

said fastener comprising:
- a) a stem, having a longitudinal central axis, for insertion within said hole defined within said at least one panel member;
- b) a head attached to a first end of said stem for engaging a first surface portion of said at least one panel member when said stem of said fastener is inserted into said hole defined within said at least one panel member;
- c) a substantially pointed tip, having a base portion which has a periphery of a predetermined contour which is substantially the same as said predetermined contour of said hole defined within said at least one panel member, attached to a second opposite end of said stem for initially guiding said fastener into said hole defined within said at least one panel member;
- d) at least three longitudinally extending ribs mounted upon said stem and projecting radially outwardly from said longitudinal central axis of said stem toward peripheral regions of said stem such that distal end portions of said ribs, remote from said longitudinal central axis of said stem, are substantially coincident with said periphery of said base portion of said tip so as to axially guide said fastener as said fastener is inserted through said hole defined within said at least one panel member; and
- e) at least three flexible blade means, mounted upon said at least three longitudinally extending ribs so as to be disposed within planes which are inclined with respect to said longitudinal central axis of said stem, and having end portions disposed at normal, undeflected positions at which said end portions extend beyond said periphery of said base portion of said tip for engaging edge portions of said hole defined within said at least one panel member when said stem of said fastener is inserted into said hole defined within said at least one panel member such that said end portions of said flexible blade means are deflected radially inwardly away from said normal positions so as to permit a portion of said stem of said fastener to pass through said hole defined within said at least one panel member, whereupon said end portions of said flexible blade means having passed through said hole defined within said at least one panel member, said end portions of said flexible blade means will return to said normal positions so as to engage a second surface portion of said at least one panel member and thereby retain said fastener inserted within said at least one panel member;

wherein said at least three flexible blade means mounted upon said at least three longitudinally extending ribs are longitudinally offset by a predetermined amount with respect to each other such that each one of said at least three flexible blade means mounted upon said at least three longitudinally extending ribs is longitudinally offset by a predetermined amount with respect to each adjacent one of said at least three flexible blade means so as to facilitate insertion of said fastener into said hole defined within said at least one panel member and to enhance extraction resistance of said fastener out from said hole defined within said at least one panel member.

16. The combination as set forth in claim 15, wherein:

said at least three longitudinally extending ribs comprises four ribs equiangularly spaced about said longitudinal central axis of said stem.

17. The combination as set forth in claim 16, wherein:

said four ribs are disposed within two planes which intersect each other at said longitudinal central axis of said stem.

18. The combination as set forth in 16, wherein:

said at least three flexible blade means comprise four sets of flexible blade means.

19. The combination as set forth in claim 18, wherein:

said four sets of flexible blade means are mounted upon opposite sides of only two of said four longitudinally extending ribs with two sets of said four sets of flexible blade means being mounted upon opposite sides of each one of said only two of said four longitudinally extending ribs.

20. The combination as set forth in claim 19, wherein:

each one of said two sets of said four sets of flexible blade means mounted upon a particular one of said only two of said four longitudinally extending ribs is longitudinally offset, by a first predetermined amount, with respect to the other one of said two sets of flexible blade means mounted upon said particular one of said only two of said four longitudinally extending ribs, and is also longitudinally offset with respect to said other two sets of said four sets of flexible blade means mounted upon the other one of said only two of said four longitudinally extending ribs, by a second predetermined amount which is different from said first predetermined amount, so as to facilitate insertion of said fastener into said hole defined within said at least one panel member and to enhance extraction resistance of said fastener out from said hole defined within said at least one panel member.

21. The combination as set forth in claim 20, wherein:

said first and second predetermined offset amounts defined between said sets of flexible blade means comprises xp/n wherein p comprises the distance defined between successive flexible blade means within a particular set of flexible blade means, n comprises the number of sets of said flexible blade means, and x comprises a number between 1 and n−1 which designates the spacing, in terms of sets, between said particular set of flexible blade means and another one of said four sets of flexible blade means.

22. The combination as set forth in claim 15, wherein:

said at least one panel member comprises a pair of panel members to be secured together by said fastener.

23. The combination as set forth in claim 15, wherein:

said at least three flexible blade means comprises at least three sets of longitudinally spaced flexible blade means with each set of said at least three sets of said flexible blade means being longitudinally offset by a predetermined amount with respect to the other sets of said at least three sets of said flexible blade means such that each one of said at least three sets of said flexible blade means is longitudinally offset by a predetermined amount with respect to each adjacent one of said other sets of said at least three sets of said flexible blade means whereby a particular one of said flexible blade means within a particular set of said at least three sets of said flexible blade means is progressively offset by a predetermined amount from other flexible blade means disposed within said other sets of said at least three sets of said flexible blade means as considered in a circumferential direction about said longitudinal central axis of said stem.

24. The combination as set forth in claim 15, wherein:

said at least three longitudinally extending ribs are equi-angularly spaced about said longitudinal central axis of said stem.

* * * * *